(12) United States Patent
Blackwood

(10) Patent No.: US 11,065,649 B2
(45) Date of Patent: Jul. 20, 2021

(54) IMPLEMENT FOR CLEANING LIVESTOCK FEED BUNKS

(71) Applicant: Ryan Blackwood, Clay Center, KS (US)

(72) Inventor: Ryan Blackwood, Clay Center, KS (US)

(*) Notice: Subject to any disclaimer, the term of this patent is extended or adjusted under 35 U.S.C. 154(b) by 159 days.

(21) Appl. No.: 16/453,785

(22) Filed: Jun. 26, 2019

(65) Prior Publication Data
US 2020/0406303 A1 Dec. 31, 2020

(51) Int. Cl.
*A01K 5/01* (2006.01)
*B08B 9/08* (2006.01)
*B08B 1/04* (2006.01)
*A47L 11/38* (2006.01)

(52) U.S. Cl.
CPC .............. *B08B 1/04* (2013.01); *A01K 5/01* (2013.01); *A47L 11/38* (2013.01); *B08B 9/08* (2013.01)

(58) Field of Classification Search
CPC .. A01K 5/00; A01K 5/01; A47L 11/38; A47L 11/4036; A47L 11/4052; B08B 9/08
USPC ...... 15/56, 104.096, 78, 79.1, 79.2, 98, 230, 15/230.14, 230.16, 236.04
See application file for complete search history.

(56) References Cited

U.S. PATENT DOCUMENTS

| | | |
|---|---|---|
| 1,675,059 A | 6/1928 | Sharp |
| 2,412,108 A | 12/1946 | Toti et al. |
| 3,087,179 A | 4/1963 | Talboys |
| 3,099,852 A * | 8/1963 | Grant ............... E01H 1/005 15/50.3 |
| 3,137,018 A | 6/1964 | Seffker |
| 3,391,025 A | 7/1968 | Foxx et al. |
| 3,611,465 A | 10/1971 | Rasmussen |
| 3,643,274 A | 2/1972 | Hodges |
| 3,778,857 A | 12/1973 | Hughes |
| 3,922,745 A | 12/1975 | Lehman |
| 4,480,350 A | 11/1984 | White |
| 4,543,678 A | 10/1985 | Cox |
| 4,620,341 A | 11/1986 | Rigby |
| 5,148,569 A | 9/1992 | Jailor et al. |
| 6,439,279 B1 | 8/2002 | Underwood |
| 8,196,251 B2 * | 6/2012 | Lynch ............. E04D 13/0765 15/236.04 |
| 8,656,544 B1 | 2/2014 | Anderson |
| 2002/0192065 A1 | 12/2002 | Underwood |

* cited by examiner

*Primary Examiner* — Randall E Chin
(74) *Attorney, Agent, or Firm* — Jeffrey L. Thompson; Thompson Law, P.A.

(57) ABSTRACT

An implement for cleaning debris from feed bunks has a frame adapted to be coupled to a vehicle, a transverse shaft rotatably supported by bearing assemblies on the frame and extending laterally beyond one side of the vehicle, a drive motor for rotatably driving the shaft, and a plurality of strips of flexible material connected to an outer end portion of the shaft. The strips of flexible material can be baler belt sections arranged with a tread pattern on a leading surface to help pick up debris and liquid from feed bunks during operation. The strips of flexible material are attached to mounting surfaces on diametrically opposed sides of the shaft and arranged so that free ends of the strips strike and fling debris from the feed bunk during rotation. The drive motor has an adjustable rotation speed to accommodate differing amounts and conditions of debris in the feed bunk.

18 Claims, 5 Drawing Sheets

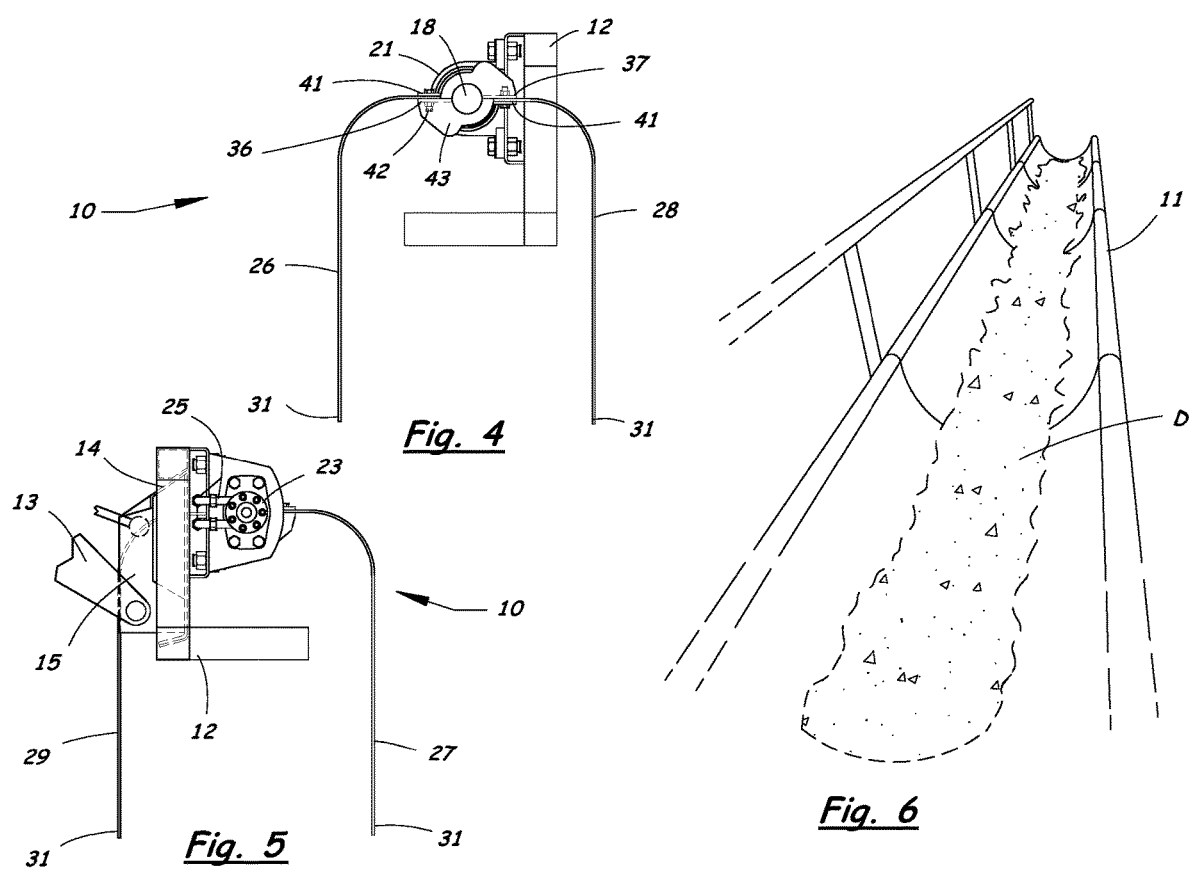

IMPLEMENT FOR CLEANING LIVESTOCK FEED BUNKS

BACKGROUND OF THE INVENTION

Field of the Invention

The present invention relates generally to devices and methods for clearing debris from surfaces, and in particular, to implements for cleaning livestock feed bunks.

Description of the Related Art

Livestock feed bunks are commonly used to feed livestock, such as cattle. The feed bunks are typically continuous troughs positioned along one side of a livestock pen. Feed bunks are typically made of concrete and have a U-shaped cross section with an open side facing upwardly for receiving feed from a feed wagon and for allowing animals to extend their heads into the feed bunk to eat the feed. Feed bunks are typically filled on a regular basis (e.g., once or twice daily) by driving a feed wagon alongside the feed bunk and conveying feed from the feed wagon into the feed bunk.

Over time feed bunks often become partially or completely clogged with debris, such as spoiled feed, roughage, snow, dirt, rocks, water, and so forth. It then becomes necessary to remove the debris from the feed bunks to restore the feed bunks to their intended capacity and avoid feed spoilage due to melting snow or standing liquids.

Feed bunks are often cleaned manually by hand shovels, brooms and the like. However, manual cleaning is very time consuming and difficult, which tends to discourage feedlot operators from performing timely and regular cleaning with their limited labor resources.

Mechanized feed bunk cleaners have also been described in the prior art. For example, U.S. Pat. No. 3,778,857 of Hughes discloses a feed bunk cleaner that uses an auger assembly and rotating brush assembly to clean feed bunks. U.S. Pat. No. 3,611,465 of Rasmussen and U.S. Pat. No. 4,543,678 of Cox disclose feed bunk cleaners that use rotatable brushes connected to boom arms to clean feed bunks. U.S. Pat. No. 3,643,274 of Hodges discloses a feed trough cleaner that uses a longitudinally extending rotating brush to clean feed troughs.

Although the mechanized feed bunk cleaners described in the prior art offer an improvement over other methods of cleaning feed bunks (e.g., hand shovels and brooms), such mechanized feed bunk cleaners are often unable to efficiently and reliably clean feed bunks in large commercial feedlots.

There is a need in the industry for an improved implement for cleaning livestock feed bunks.

SUMMARY OF THE INVENTION

An object of the present invention is to provide an implement for cleaning debris from feed bunks that can be attached to the front of existing vehicles, such as skid steer vehicles and front loader tractors.

A further object of the present invention is to provide an implement for cleaning feed bunks that uses strips of flexible material connected to a rotating shaft to efficiently and reliably clean debris from feed bunks.

A further object of the present invention is to provide an implement with a quick attach coupling and self-contained drive motor to facilitate quick and easy connections to skid steer and front loader vehicles.

A further object of the present invention is to provide an implement that uses baler belt sections as strips of flexible material connected to a rotating shaft for striking and flinging debris from feed bunks, and particularly belt sections that have a tread pattern on a leading surface of the belt relative to a direction of rotation of the shaft to help remove particles and liquids from feed bunks.

A further object of the present invention is to provide an implement that has strips of flexible material attached to mounting surfaces on diametrically opposed sides of a rotatably driven shaft to clean debris from feed bunks.

A still further object of the present invention is to provide an implement for cleaning feed bunks that is robust in construction, reliable and efficient in operation, and capable of a long operating life for cleaning feed bunks.

These and other objects of the present invention are accomplished by an implement for cleaning debris from feed bunks that has a frame adapted to be coupled to a vehicle, a transverse shaft rotatably supported by bearing assemblies on the frame and extending laterally beyond one side of the vehicle, a drive motor for rotatably driving the shaft, and a cleaning head formed by a plurality of strips of flexible material connected to an outer end portion of the shaft. The strips of flexible material can be baler belt sections arranged with a tread pattern on a leading surface to help pick up debris and liquid from feed bunks during operation. The strips of flexible material are attached to mounting surfaces on diametrically opposed sides of the shaft and arranged so that free ends of the strips strike and fling debris from the feed bunk during rotation. The drive motor has an adjustable rotation speed to accommodate differing amounts and conditions of debris in the feed bunk.

According to one aspect of the present invention, an implement is provided for cleaning debris from feed bunks, comprising: a frame attached to a vehicle; a transverse shaft rotatably supported by the frame, the shaft having an outer end portion extending laterally from one side of the vehicle to reach a feed bunk located beside the vehicle as the vehicle moves along a path parallel to the feed bunk; a drive motor connected to the shaft for rotatably driving the shaft; and a strip of flexible material connected to the outer end portion of the shaft and arranged to rotate with the shaft and strike debris in the feed bunk to fling the debris from the feed bunk as the shaft rotates.

According to another aspect of the present invention, an implement is provided for cleaning livestock feed bunks, comprising: a frame; a transverse shaft rotatably supported by the frame, the shaft having an outer end portion extending laterally from one side of the frame; a drive motor connected to an inner end portion of the shaft for rotatably driving the shaft; and a plurality of strips of flexible material connected to a mounting structure on the outer end portion of the shaft. The strips of flexible material are arranged to rotate with the shaft so that free ends of the strips of flexible material strike debris in the feed bunk and fling the debris from the feed bunk as the shaft rotates.

Numerous other objects of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings:

FIG. 4 is a left side end view of the implement.

FIG. 5 is a right side end view of the implement.

FIG. 6 is a perspective view of a feed bunk containing debris.

DETAILED DESCRIPTION OF THE INVENTION

Figure 1:
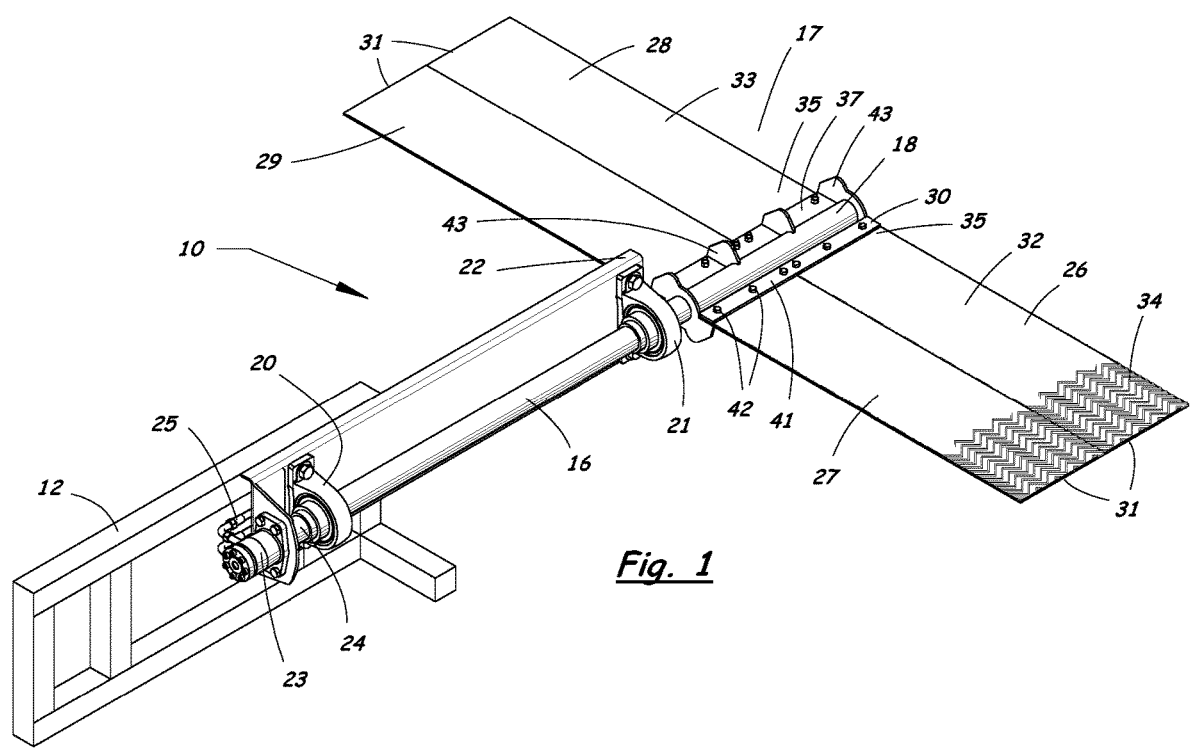
FIG. 1 is a perspective view of an implement for cleaning debris from livestock feed bunks according to the present invention.
Figure 2:
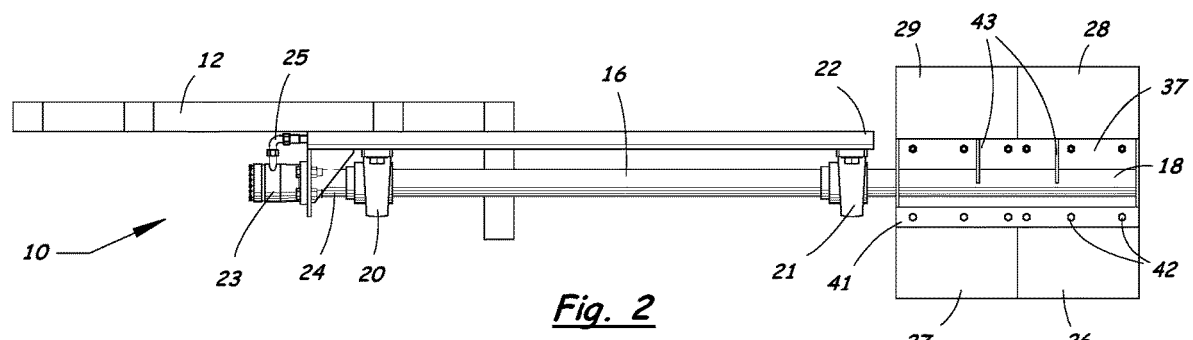
FIG. 2 is a plan view of the implement.
Figure 3:
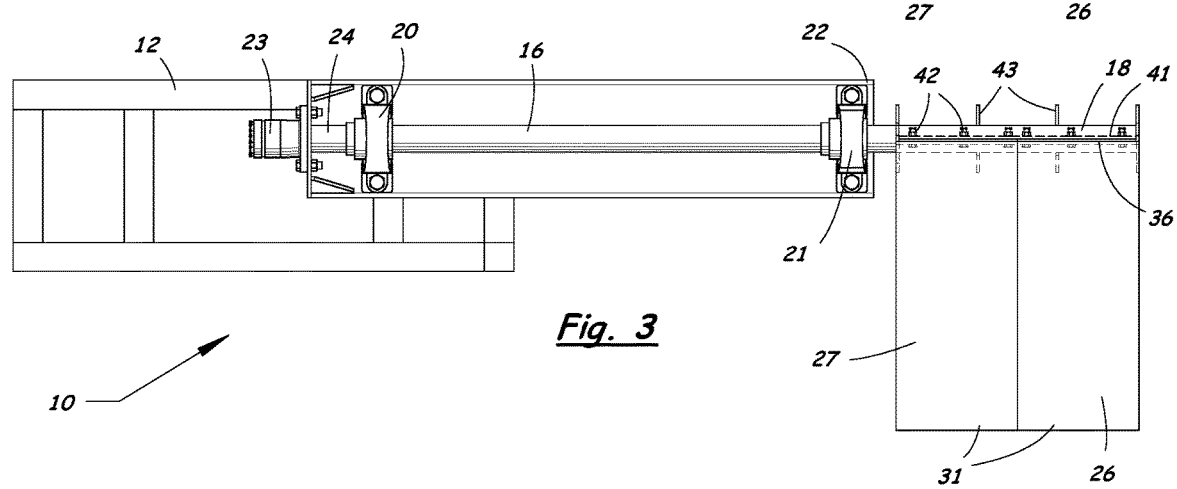
FIG. 3 is a front view of the implement.
Figure 7:
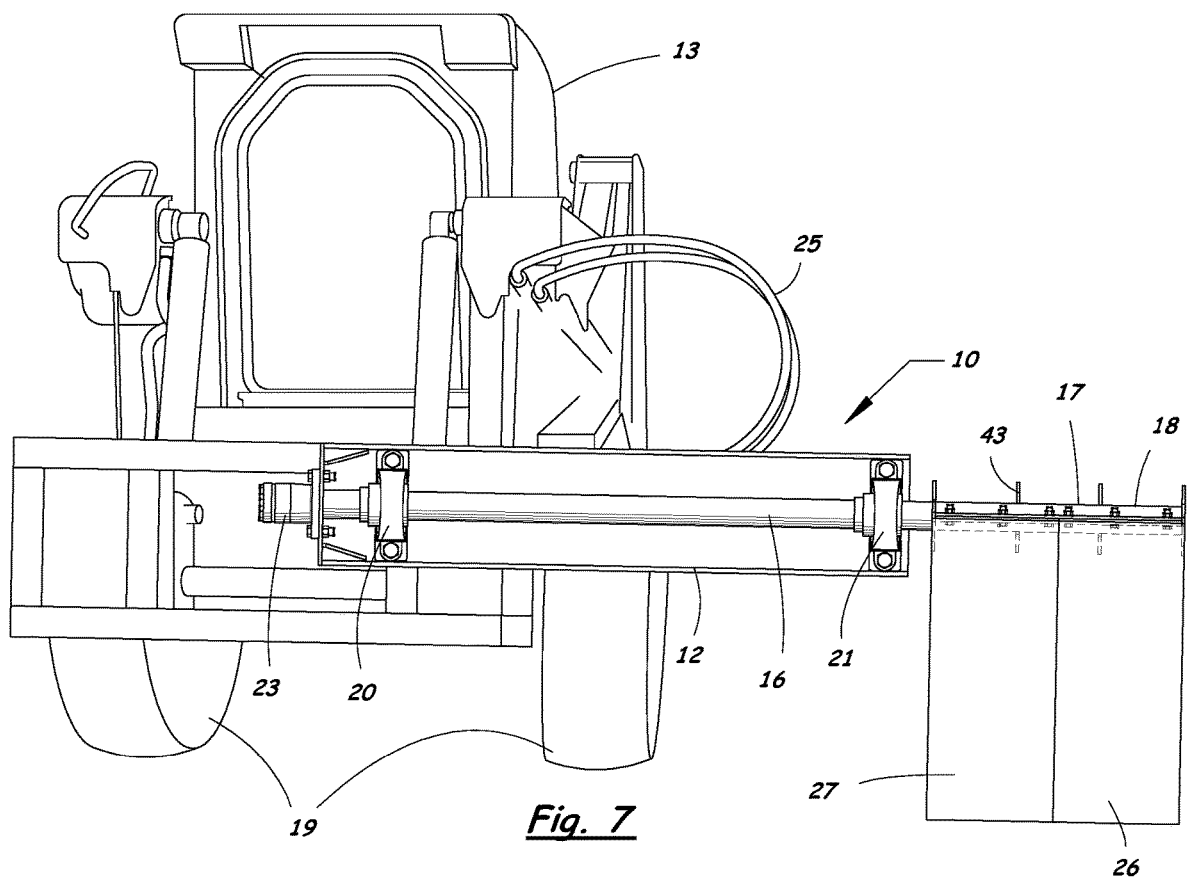
FIG. 7 is a front view of the implement attached to the front end of a skid steer vehicle.
Figure 8:
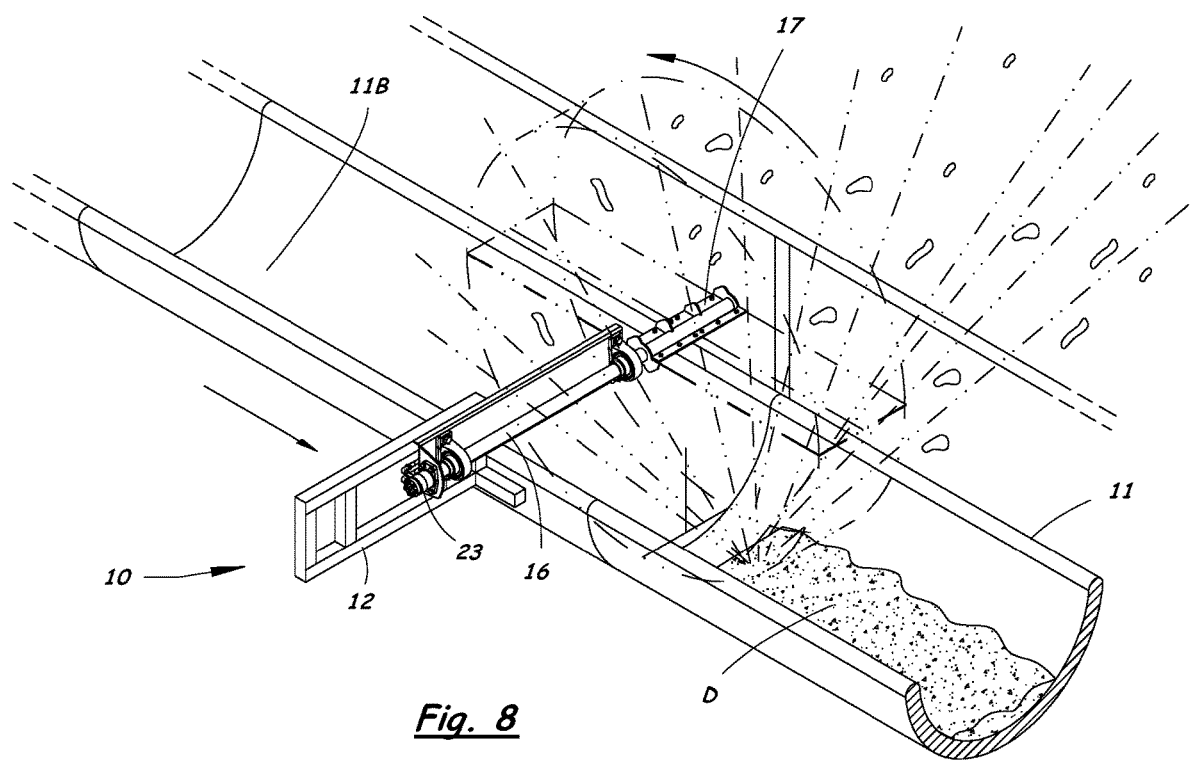
FIG. 8 is a perspective view of the implement in operation with the strips of flexible material striking and flinging debris from the feed bunk.

An implement 10 for cleaning debris from livestock feed bunks 11 according to the present invention will now be described with reference to FIGS. 1 to 8 of the accompanying drawings.

The implement 10 includes a frame 12 attached to a vehicle 13. The frame 12 can be a welded tubular framework or other suitable rigid structure. The frame 12 has a quick coupling system 14 on its rear side (see FIG. 5) that mates with a corresponding quick coupling structure 15 on the front of the vehicle 13.

The frame 12 is attached to the front of the vehicle 13 and extends laterally from one side of the vehicle 13 to support a transverse shaft 16 and a rotating cleaning head 17 attached to an outer end portion 18 of the shaft 16. The rotating cleaning head 17 is positioned beside the vehicle 13 as the vehicle 13 moves along a path parallel to the feed bunk 11 to clean debris D from the feed bunk 11. The vehicle 13 can be a skid steer vehicle supported by rubber tires 19 or tracks, or the vehicle 13 can be a tractor with a front end loader. The implement 10 of the present invention can be attached to the vehicle 13 in place of a front end loader bucket.

The transverse shaft 16 is rotatably supported by first and second bearing assemblies 20, 21 fixed to the frame 12. The outer end portion 18 of the shaft 16 extends laterally beyond the end 22 of the frame 12 to support the cleaning head 17 over the feed bunk 11. The bearing assemblies 20, 21 are spaced apart a relatively large distance to minimize bending stresses on the shaft 16 and lateral twist forces on the bearing assemblies 20, 21.

A drive motor 23 is connected to an inner end portion 24 of the shaft 16 for rotatably driving the shaft 16. The drive motor 23 has an adjustable rotation speed that allows an operator to change the rotation speed to accommodate differing amounts and conditions of debris in the feed bunk 11.

The drive motor 23 is preferably a hydraulic motor connected to hydraulic hoses 25 on the vehicle 13 that supply a continuous flow of hydraulic fluid and hydraulic pressure to the hydraulic motor 23 during operation. The rotation speed of the hydraulic motor 23 can be adjusted by changing the flow rate of the hydraulic fluid or by adjusting the speed setting on the hydraulic motor 23 in a known manner. A suitable rotation speed for the hydraulic motor 23 in the present invention will be approximately 300 to 1,000 rpm.

The cleaning head 17 comprises a plurality of strips 26-29 of flexible material connected to a mounting structure 30 on the outer end portion 18 of the shaft 16. The strips 26-29 of flexible material are in the nature of floppy belts instead of stiff brush bristles. The strips 26-29 of flexible material are arranged to rotate with the shaft 16 so that free ends 31 of the strips 26-29 of flexible material strike debris in the feed bunk 11 and fling the debris from the feed bunk 11 as the shaft 16 rotates. The strips 26-29 of flexible material are generally flat strips of material with a leading surface 32 and a trailing surface 33 relative to a direction of rotation of the shaft 16. The leading surface 32 has a tread 34 that helps pick up debris, particularly fines and liquid, from feed bunks 11 during operation. The tread 34 can be a chevron tread pattern, as illustrated in FIG. 1, or other tread styles, such as a diamond shaped tread pattern or a straight pattern of raised transverse ribs.

The strips 26-29 of flexible material can be, for example, sections of baler belts that are widely available and commonly used in baler implements for forming large round hay bales. For example, belt sections having a width of approximately 4 to 10 inches can be cut to approximately 32 to 40 inch lengths (preferably 36 inch lengths) from a long new or used baler belt or a replacement roll of bulk baler belt for use in the present invention. Such belts are available, for example, in 7 inch×70 foot 3-ply continuous bulk baler belting with Chevron pattern from Apache Hose & Belting Company Inc., Cedar Rapids, Iowa, as Product No. 21200566. Suitable belting is also available from other sources, such as Americas Seed & Belting of Bonham, Tex., and as OEM replacement parts from the respective manufacturers of large round hay balers. Conveyor belt sections can also be used as the strips 26-29 of flexible material.

The strips 26-29 of flexible material each have a first end 35 connected to the mounting structure 30 on the outer end portion 18 of the shaft 16 and a second free end 31 that engages debris in the feed bunk 11. The mounting structure 30 includes a first mounting surface 36 located on a first side of the outer end portion 18 of the shaft 16 for securing a first plurality of strips 26, 27 to the shaft 16. The mounting structure 30 includes a second mounting surface 37 located on a second side of the outer end portion 18 of the shaft 16 diametrically opposite from the first mounting surface 36 for securing a second plurality of strips 28, 29 to the shaft 16. By providing the first and second mounting surfaces 36, 37 on diametrically opposed sides of the shaft 16, the cleaning head 17 has a balanced mass during operation, and the strips 26-29 of flexible material are allowed adequate space to bend and flex during operation to provide excellent cleaning capacity and efficiency.

The mounting structure 30 can be made by securing (e.g., welding) a first rigid piece of metal to the outer surface of the end portion 18 of the shaft 16 to provide the first mounting surface 36, and a second rigid piece of metal to the shaft 16 to provide the second mounting surface 37. The first and second rigid pieces of metal can be, for example, 2 inch×20 inch pieces of ¼ inch thick metal with a plurality of spaced mounting holes. A corresponding metal plate 41 is provided with the same pattern of mounting holes for use as a washer plate. The strips 26-29 of flexible material are sandwiched between the mounting surfaces 36, 37 and the washer plates 41 and clamped in place using threaded fasteners 42 that extend through the mounting holes. A plurality of reinforcement gussets 43 are provided on the backsides of the mounting surfaces 36, 37 to reinforce the mounting structure 30.

In one embodiment of the present invention, the cleaning head 17 includes a first pair of 10 inch wide baler belt sections attached side-by-side to the first mounting surface 36, and a second pair of 10 inch wide baler belt sections attached side-by-side to the second mounting surface 37. However, the number of belt sections and belt widths can be changed to accommodate feed bunk shapes and sizes, as well as available belt sizes.

The strips 26-29 of flexible material are longer than the depth of the feed bunks 11 being cleaned. The transverse shaft 16 is positioned at a height above a bottom 11B of the feed bunk 11 that allows the strips 26-29 of flexible material to impinge upon the bottom 11B of the feed bunk 11 during rotation. For example, the height of the transverse shaft 16 above the bottom of the feed bunk is approximately 1 to 3 inches shorter than a length of the strips 26-29 of flexible material. The operator can adjust the height of the transverse shaft 16 by raising and lowering the implement 10 until the sweet spot of operating efficiency is determined, which will typically be with an overlap of approximately 2 inches between the path of movement of the outer tip of the strips 26-29 of flexible material and the bottom 11B of the feed bunk 11.

The transverse shaft 16 is rotatably driven in a direction and at a speed to cause the strips 26-29 of flexible material on the cleaning head 17 to throw debris forward and out of the feed bunk 11 as the vehicle 13 is driven in a forward direction beside the feed bunk 11.

The implement 10 has been described herein as functioning to remove debris D from livestock feed bunks 11. Such debris can be in many forms, such as spoiled feed, roughage, snow, dirt, rocks, water, and so forth. As used herein, the term debris will be understood to include all such foreign materials that may be present in a feed bunk 11 being cleaned.

While the invention has been described in connection with specific embodiments thereof, it is to be understood that this is by way of illustration and not of limitation, and the scope of the appended claims should be construed as broadly as the prior art will permit.

What is claimed is:

1. In combination, a vehicle and an implement for cleaning debris from feed bunks, the implement comprising:
    a frame attached to the vehicle;
    a transverse shaft rotatably supported by the frame, said shaft having an outer end portion extending laterally from one side of the vehicle to reach a feed bunk located beside the vehicle as the vehicle moves along a path parallel to the feed bunk;
    a drive motor connected to said shaft for rotatably driving the shaft; and
    a strip of flexible material connected to the outer end portion of the shaft and arranged to rotate with the shaft and strike debris in the feed bunk to fling the debris from the feed bunk as the shaft rotates;
    wherein said strip of flexible material comprises a plurality of strips of flexible material connected to the outer end portion of the shaft;
    wherein said plurality of strips of flexible material each have a first end connected to a mounting structure on said shaft and a second free end that engages debris in the feed bunk; and
    wherein said mounting structure comprises a first mounting surface located on a first side of the outer end portion of the shaft for securing a first plurality of strips of flexible material to said shaft, and a second mounting surface located on a second side of the outer end portion of the shaft diametrically opposite from said first mounting surface for securing a second plurality of strips of flexible material to said shaft.

2. The combination according to claim 1, wherein said strip of flexible material comprises a generally flat strip of material with a leading surface and a trailing surface relative to a direction of rotation of the shaft, and wherein said leading surface comprises a tread that helps pick up debris and liquid from feed bunks during operation.

3. The combination according to claim 2, wherein said tread has a chevron pattern.

4. The combination according to claim 1, wherein said strip of flexible material is longer than a depth of the feed bunk, and wherein said transverse shaft is positioned at a height above a bottom of said feed bunk that allows said strip of flexible material to impinge upon the bottom of said feed bunk during rotation.

5. The combination according to claim 4, wherein a height of said transverse shaft above the bottom of said feed bunk is approximately 1 to 3 inches shorter than a length of said strip of flexible material.

6. The combination according to claim 1, wherein said transverse shaft is rotatably supported by first and second bearing assemblies fixed to said frame.

7. The combination according to claim 1, wherein said drive motor is a hydraulic drive motor having an adjustable rotation speed that allows an operator to change the rotation speed to accommodate differing amounts and conditions of debris in the feed bunk.

8. The combination according to claim 1, wherein said transverse shaft is rotatably driven in a direction and at a speed to cause said strip of flexible material to throw debris forward and out of said feed bunk.

9. In combination, a vehicle and an implement for cleaning debris from feed bunks, the implement comprising:
    a frame attached to the vehicle;
    a transverse shaft rotatably supported by the frame, said shaft having an outer end portion extending laterally from one side of the vehicle to reach a feed bunk located beside the vehicle as the vehicle moves along a path parallel to the feed bunk;
    a drive motor connected to said shaft for rotatably driving the shaft; and
    a strip of flexible material connected to the outer end portion of the shaft and arranged to rotate with the shaft and strike debris in the feed bunk to fling the debris from the feed bunk as the shaft rotates;
    wherein said strip of flexible material comprises a plurality of baler belt sections that are attached to the mounting structure on the outer end portion of the shaft.

10. In combination, a vehicle and an implement for cleaning debris from feed bunks, the implement comprising:
    a frame attached to the vehicle;
    a transverse shaft rotatably supported by the frame, said shaft having an outer end portion extending laterally from one side of the vehicle to reach a feed bunk located beside the vehicle as the vehicle moves along a path parallel to the feed bunk;
    a drive motor connected to said shaft for rotatably driving the shaft; and
    a strip of flexible material connected to the outer end portion of the shaft and arranged to rotate with the shaft and strike debris in the feed bunk to fling the debris from the feed bunk as the shaft rotates;

wherein said vehicle is a skid steer vehicle, and said frame is attached to a front of said skid steer vehicle by a quick coupling system.

11. The combination according to claim 10, wherein said strip of flexible material comprises a plurality of strips of flexible material connected to the outer end portion of the shaft.

12. The combination according to claim 11, wherein said plurality of strips of flexible material each have a first end connected to a mounting structure on said shaft and a second free end that engages debris in the feed bunk.

13. An implement for cleaning livestock feed bunks, comprising:
a frame;
a transverse shaft rotatably supported by the frame, said shaft having an outer end portion extending laterally from one side of the frame;
a drive motor connected to an inner end portion of said shaft for rotatably driving the shaft; and
a plurality of strips of flexible material connected to a mounting structure on the outer end portion of the shaft and arranged to rotate with the shaft so that free ends of the strips of flexible material strike debris in the feed bunk and fling the debris from the feed bunk as the shaft rotates;
wherein said mounting structure comprises a first mounting surface located on a first side of the outer end portion of the shaft for securing a first plurality of strips of flexible material to said shaft, and a second mounting surface located on a second side of the outer end portion of the shaft diametrically opposite from said first mounting surface for securing a second plurality of strips of flexible material to said shaft.

14. The implement according to claim 13, wherein said plurality of strips of flexible material each comprises a generally flat strip of material with a leading surface and a trailing surface relative to a direction of rotation of the shaft, and wherein said leading surface comprises a tread that helps pick up debris and liquid from feed bunks during operation.

15. The implement according to claim 13, wherein said transverse shaft is rotatably supported by first and second bearing assemblies fixed to said frame.

16. The implement according to claim 13, wherein said drive motor has an adjustable rotation speed to allow an operator to change the rotation speed to accommodate differing amounts and conditions of debris in the feed bunk.

17. The implement according to claim 13, wherein said transverse shaft is rotatably driven in a direction and at a speed to cause said plurality of strips of flexible material to throw debris forward and out of said feed bunk.

18. An implement for cleaning livestock feed bunks, comprising:
a frame;
a transverse shaft rotatably supported by the frame, said shaft having an outer end portion extending laterally from one side of the frame;
a drive motor connected to an inner end portion of said shaft for rotatably driving the shaft; and
a plurality of strips of flexible material connected to a mounting structure on the outer end portion of the shaft and arranged to rotate with the shaft so that free ends of the strips of flexible material strike debris in the feed bunk and fling the debris from the feed bunk as the shaft rotates;
wherein said plurality of strips of flexible material comprise a plurality of baler belt sections that are attached to the mounting structure on the outer end portion of the shaft.

* * * * *